US009545673B2

(12) United States Patent
Hirose (10) Patent No.: US 9,545,673 B2
(45) Date of Patent: Jan. 17, 2017

(54) VIBRATION REDUCTION DEVICE FOR MACHINE TOOL (71) Applicant: MURATA MACHINERY, LTD., Kyoto-shi, Kyoto (JP)

(72) Inventor: Mitsunori Hirose, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 0 days.

(21) Appl. No.: 14/646,480

(22) PCT Filed: Oct. 25, 2013

(86) PCT No.: PCT/JP2013/078908
§ 371 (c)(1),
(2) Date: May 21, 2015

(87) PCT Pub. No.: WO2014/087757
PCT Pub. Date: Jun. 12, 2014

(65) Prior Publication Data
US 2015/0336178 A1 Nov. 26, 2015

(30) Foreign Application Priority Data

Dec. 3, 2012 (JP) .................................. 2012-264518

(51) Int. Cl.
*B23Q 11/00* (2006.01)
*B23B 29/24* (2006.01)
*B23B 29/00* (2006.01)

(52) U.S. Cl.
CPC ......... *B23B 29/242* (2013.01); *B23Q 11/0035* (2013.01); *B23B 2250/16* (2013.01);
(Continued)

(58) Field of Classification Search
CPC ...... B23B 29/24; B23B 29/242; B23B 29/243; B23Q 11/0032
See application file for complete search history.

(56) References Cited

U.S. PATENT DOCUMENTS 2,931,464 A * 4/1960 Zwick ............... B23Q 11/0032
188/266
3,115,051 A * 12/1963 Burg ....................... B23Q 1/26
408/241 R
(Continued)

FOREIGN PATENT DOCUMENTS

CN       1284020 A     2/2001
DE  10 2010 011 851 A1   9/2010
(Continued)

OTHER PUBLICATIONS

Official Communication issued in International Patent Application No. PCT/JP2013/078908, mailed on Nov. 26, 2013.
(Continued)

*Primary Examiner* — Will Fridie, Jr.
(74) *Attorney, Agent, or Firm* — Keating & Bennett, LLP (57) ABSTRACT A vibration reducing device for a machine tool reduces vibration generated in a tool support body supporting a tool. The vibration reducing device includes an attenuation inducing member and a pressing and fitting mechanism. The attenuation inducing member is brought into contact with the tool support body so as to generate a frictional force in a direction in which it acts as a resistance to the vibration generated in the tool support body. The attenuation inducing member has a rigidity in a direction conforming to a contact surface between the attenuation inducing member and the tool support body, which rigidity is higher than that of the tool support body. The pressing and fitting mechanism fits the attenuation inducing member to the tool support body in a pressed condition.

3 Claims, 5 Drawing Sheets (52) U.S. Cl.
CPC ..... *B23B 2260/10* (2013.01); *B23B 2260/108* (2013.01); *B23B 2260/136* (2013.01); *Y10T 82/2508* (2015.01)

(56) References Cited

U.S. PATENT DOCUMENTS

| | | | | |
|---|---|---|---|---|
| 3,499,351 A | * | 3/1970 | Jacobson | B23Q 17/0976 408/143 |
| 3,522,864 A | * | 8/1970 | Richter | B23Q 1/0063 188/268 |
| 3,559,512 A | * | 2/1971 | Aggarwal | B23B 29/022 188/322.5 |
| 3,999,632 A | * | 12/1976 | Armbrust | B23Q 17/0976 188/380 |
| 4,491,044 A | * | 1/1985 | Haas | B23B 29/242 408/143 |
| 5,033,340 A | * | 7/1991 | Siefring | B23B 29/00 248/630 |
| 5,342,017 A | * | 8/1994 | McCalmont | F16F 15/0237 248/632 |
| 5,871,315 A | | 2/1999 | Burt et al. | |

FOREIGN PATENT DOCUMENTS

| | | |
|---|---|---|
| JP | 08-252715 A | 10/1996 |
| JP | 2011-230217 A | 11/2011 |

OTHER PUBLICATIONS

English translation of Official Communication issued in corresponding International Application PCT/JP2013/078908, mailed on Jun. 18, 2015.

\* cited by examiner

FRONT SURFACE(FRONT SIDE)

Fig. 4

FRONT SIDE

VIBRATION REDUCTION DEVICE FOR MACHINE TOOL

CROSS REFERENCE TO THE RELATED APPLICATION

This application is based on and claims Convention priority to Japanese patent application No. 2012-264518, filed Dec. 3, 2012, the entire disclosure of which is herein incorporated by reference as a part of this application.

BACKGROUND OF THE INVENTION

1. Field of the Invention

The present invention relates to a machine tool such as, for example, a lathe or turning machine and, more specifically, to the technology of reducing vibrations generated in a tool support body during a machining operation.

2. Description of the Related Art

In a tool machine such as, for example, a lathe, vibrations are apt to occur in a tool and a tool support body due to a cutting load which acts on a machining point when the cutting process is performed on a work with the use of the tool. Those vibrations bring about adverse influences on the machining accuracy. For this reason, various attempts have been suggested to reduce the vibrations. JP Laid-open Patent Publication No. H08-252715 and JP Laid-open Patent Publication No. 2011-230217, for example, disclose such suggestions.

Figure 8:
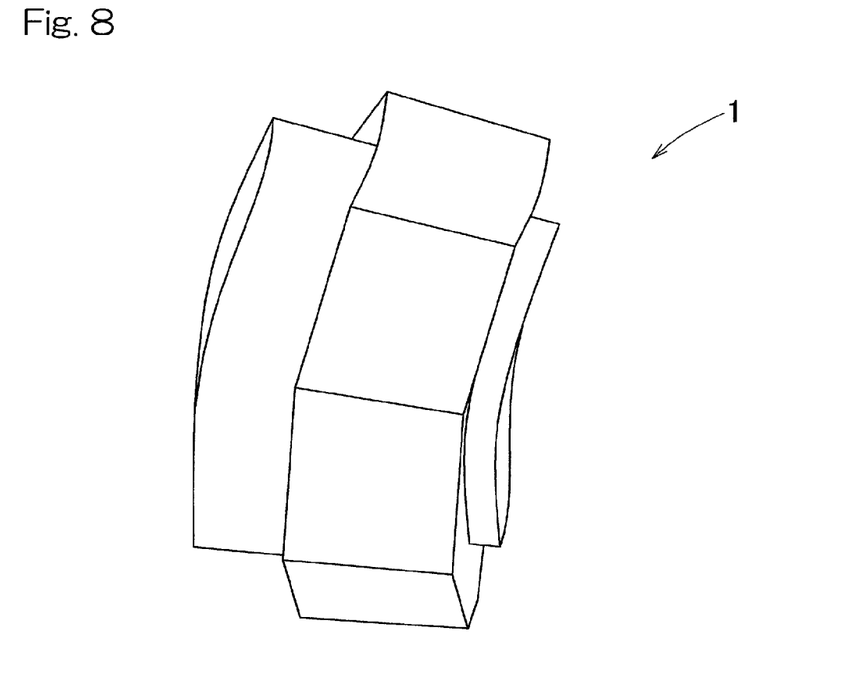
FIG. 8 is a perspective view showing one example of vibration taking place in the tool support body.

Since the tool support body is generally relatively large in size and has a high rigidity, vibrations do not occur so much as the tool, but despite of that vibrations that adversely affect the machining accuracy are generated. For example, where the tool support body is a turret type tool post, such deforming vibrations as shown in FIG. 8 are generated due to the cutting load during the machining operation. It is to be noted that in FIG. 8, the deformation of the tool support body 1 is shown as exaggerated. In order to increase the machining accuracy, not only is it needed to reduce the vibration of the tool, but the above discussed vibration occurring in the tool support body 1 is also required to be reduced.

SUMMARY OF THE INVENTION

In view of the foregoing, preferred embodiments of the present invention provide a vibration reducing device for a machine tool, which is effective to reduce the vibration generated in the tool support body during the machining operation and also to increase the machining accuracy.

A vibration reducing device for a machine tool, which is designed in accordance with a preferred embodiment of the present invention, reduces vibration generated in a tool support body to support a tool, which device includes an attenuation inducing member that is brought into contact with the tool support body so as to generate a frictional force in a direction in which it acts as a resistance to the vibration generated in the tool support body, and a pressing and fitting mechanism to fit the attenuation inducing member to the tool support body in a pressed condition. The attenuation inducing member has a rigidity in a direction conforming to a contact surface between the attenuation inducing member and the tool support body, which rigidity is higher than that of the tool support body.

According to a preferred embodiment of the present invention, using the pressing and fitting mechanism, the attenuation inducing member is fitted to the tool support body in the pressed condition. When vibration is generated in the tool support body, such vibration is transmitted to the attenuation inducing member then held in contact with the tool support body. Since the rigidity of the attenuation inducing member in the direction conforming to the contact surface therebetween is higher than that of the tool support body, a relative slip is caused by the vibration between the attenuation inducing member and the tool support body. Due to this slip, a frictional force is generated in a direction in which it acts as a resistance to the vibration generated in the tool support body. Accordingly, vibratory energies, which are a contributing factor of the vibration in the tool support body, are absorbed by frictional attenuation of the frictional force so generated.

The attenuation inducing member preferably contacts the tool support body at a plurality of contact sites during deformation of the tool support body. If contact takes place at the plurality of contact sites, a high frictional attenuating effect is obtained as compared with that afforded by one contact site.

In a preferred embodiment of the present invention, where the tool support body is in the form of a turret-shaped tool post of a round or polygonal shape having a peripheral surface to which the tool is fitted, the attenuation inducing member may contact a front surface of the tool support body over the entire periphery about a center axis of the support body. In this case, the rigidity of the attenuation inducing member in the direction conforming to the contact surface is a rigidity in a radial direction of the turret-shaped tool post.

If the attenuation inducing member is brought into contact the front surface of the tool support body, which is the turret type tool post, over the entire periphery about the center axis of the tool post, a relative slip occurs between the attenuation inducing member and the tool support body and, therefore, the frictional force acting in a direction, in which it acts as a resistance to the vibration generated in the tool support body, is easily obtained. Also, when the attenuation inducing member is brought into contact with the entire periphery about the center axis of the tool support body, the attenuation inducing member is caused to contact the tool support body at the plurality of contact sites relative to various deformations of the tool support body. For this reason, the vibration is effectively reduced.

In another preferred embodiment of the present invention, the attenuation inducing member preferably includes a first spring member seating surface that is parallel or substantially parallel to a contact surface between the tool support body and the attenuation inducing member, and the pressing and fitting mechanism includes a second spring member seating surface that confronts the first spring member seating surface, in which case the vibration reducing device also includes a fitting member, fitted to the tool support body, and a spring member interposed between the first spring member seating surface and the second spring member seating surface and configured to press the attenuation inducing member against the tool support body.

According to the above described structural feature, by a pressing force exerted by an elastic restoring force of the spring member interposed between the first spring member seating surface of the attenuation inducing member and the second spring member seating surface of the fitting member, the attenuation inducing member is pressed against the tool support body. When the attenuation inducing member is pressed against the tool support body by the spring member, deviation of the pressing force caused by, for example, processing errors and fitting errors of various members defining respective portions of the pressing and fitting mechanism is small, and therefore, the pressing force is easily controlled. For example, by exchanging the spring member with another spring member having a spring constant different from that of the spring member, or by inserting a shim between the first spring member seating surface and the spring member or between the second spring member seating surface and the spring member, the pressing force is easily changed.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
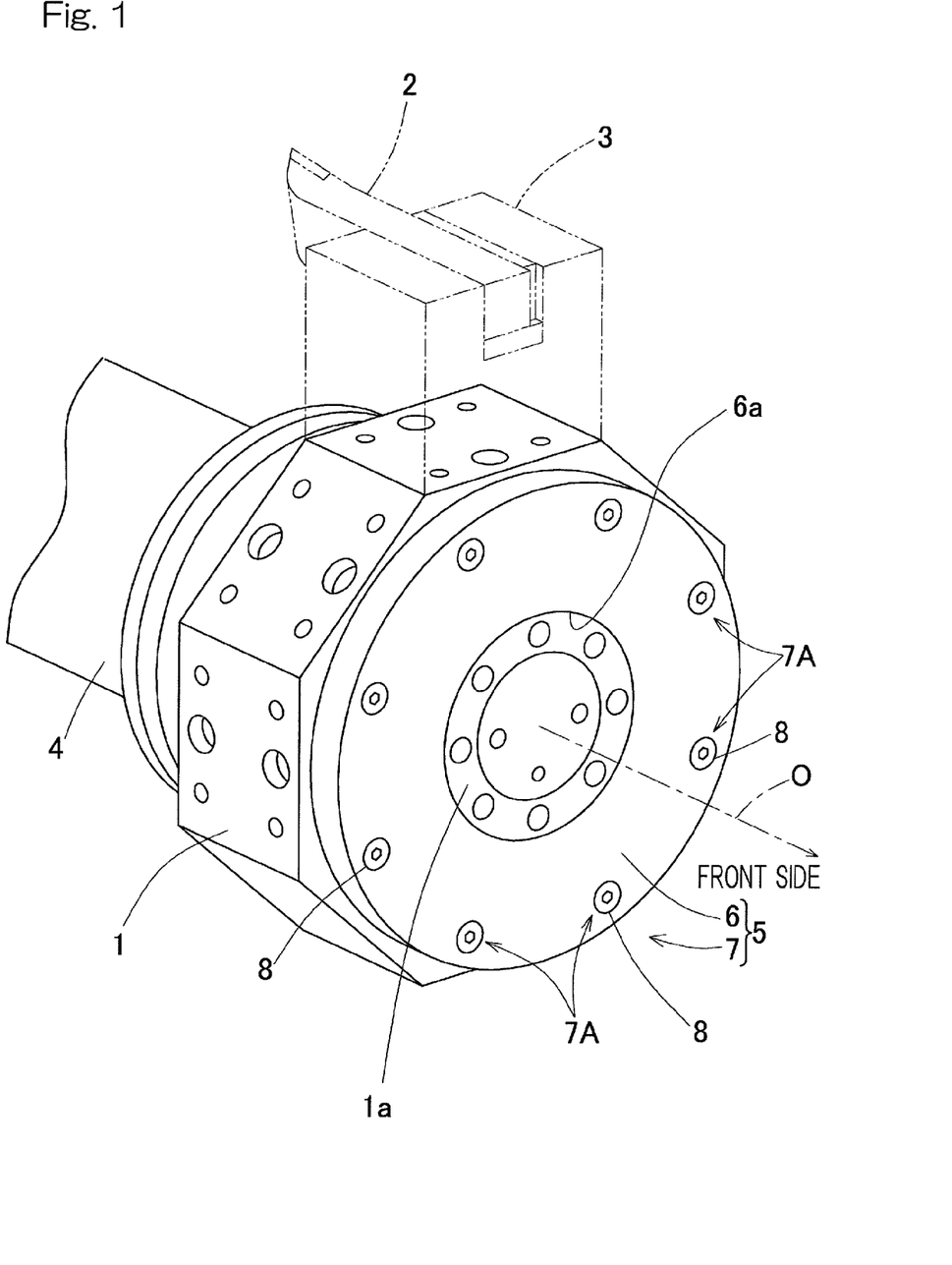
FIG. 1 is a perspective view showing a vibration reducing device for a machine tool designed in accordance with a preferred embodiment of the present invention.
Figure 2:
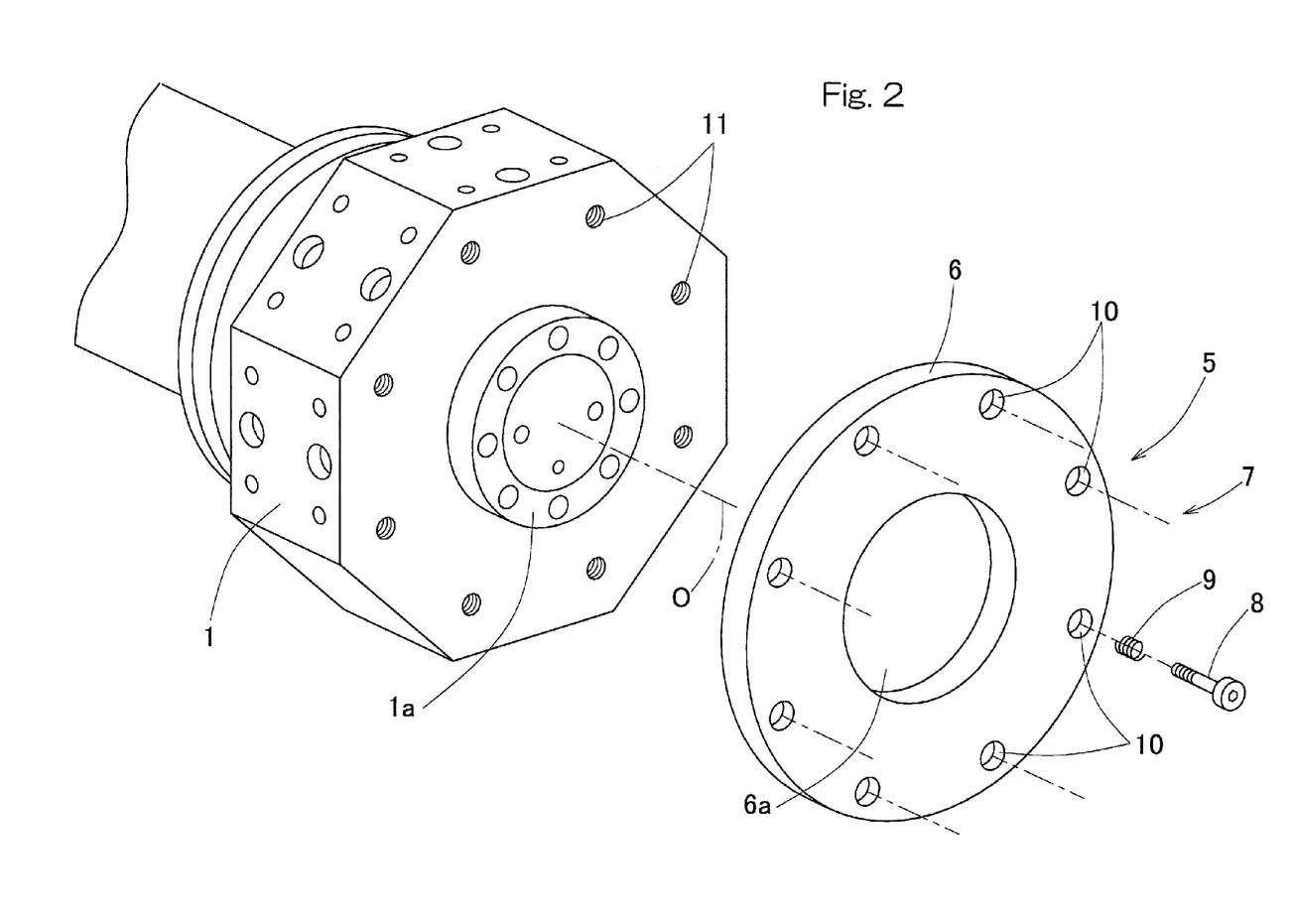
FIG. 2 is an exploded perspective view showing the vibration reducing device.

Preferred embodiments of the present invention will now be described in detail with particular reference to the accompanying drawings. A vibration reducing device for a machine tool according to a preferred embodiment of the present invention is operable to reduce vibration generated in a tool support body for supporting a tool. In particular, FIG. 1 illustrates a perspective view showing the vibration reducing device, generally identified by 5, which is provided in the tool support body 1, and FIG. 2 is an exploded view of the vibration reducing device 5.

In the present preferred embodiment, the tool support body 1 preferably is a turret-shaped tool post. The tool support body 1, which is the turret type tool post, has a front elevational shape, which is a polygonal shape, and a tool 2 may be fitted to each of outer peripheral surface segments of the tool support body 1. Material for this tool support body 1 is, for example, steel or a cast steel. The tool 2 may be fitted to the tool support body 1 through a tool holder 3 shown by the double dotted line in FIG. 1 or may be fitted directly to the tool support body 1. When the tool support body 1 is rotated, an arbitrarily chosen tool 2 out of a plurality of tools 2 fitted to the outer peripheral surface segments is indexed to an operative position.

The vibration reducing device 5 includes an attenuation inducing member 6, which is fitted to a front surface of the tool support body 1, and a pressing and fitting mechanism 7 configured to fit the attenuation inducing member 5 to the tool support body 1 in a pressed condition. The attenuation inducing member 6 is of an annular plate shape having a throughhole 6a defined at the center thereof and, while the tool support body 1 includes an axially projecting stud 1a defined in the front surface thereof in coaxial relation thereto, such attenuation inducing member 6 is fitted to the tool support body 1 with the protruding stud 1a mated in and extending through the throughhole 6a. In other words, the attenuation inducing member 6 is fitted to the front surface of the tool support body 1 so that an outer periphery of the attenuation inducing member 6 defines an inscribed circle for the tool support body 1 of polygonal shape about a center axis O of the tool support body 1 as viewed in the axial direction. In the case of the tool support body 1 of a type in which the tool 2 is fitted to each of the outer peripheral surface segments, nothing is originally provided in the front surface of the tool support body 1, and therefore, the attenuation inducing member 6 is easily and effectively disposed on the front surface of the tool support body 1.

The attenuation inducing member 6 has a rigidity in a stretching direction along a contact surface with the tool support body 1, which rigidity is higher than that of the tool support body 1. Where the tool support body 1 is a turret type tool post, the stretching direction referred to above lies in a radial direction of the turret type tool post. The rigidity, which is controversial here, indicates the dynamic rigidity against the oscillation frequency within the range of about 1,000 Hz to about 4,000 Hz although it depends on the type of the machine tool and the structure of the tool post. Because of that, so long as the dynamic rigidity within the above described frequency range, the rigidity of the attenuation inducing member 6 in the stretching direction along the contact surface referred to above is chosen so as to be higher than that of the tool support body 1. A major difference between the rigidity of the tool support body 1 and that of the attenuation inducing member 6 may lie in the difference in shape and/or dimension, or in the difference in material, or both of the difference in shape and/or dimension and the difference in material.

Figure 3:
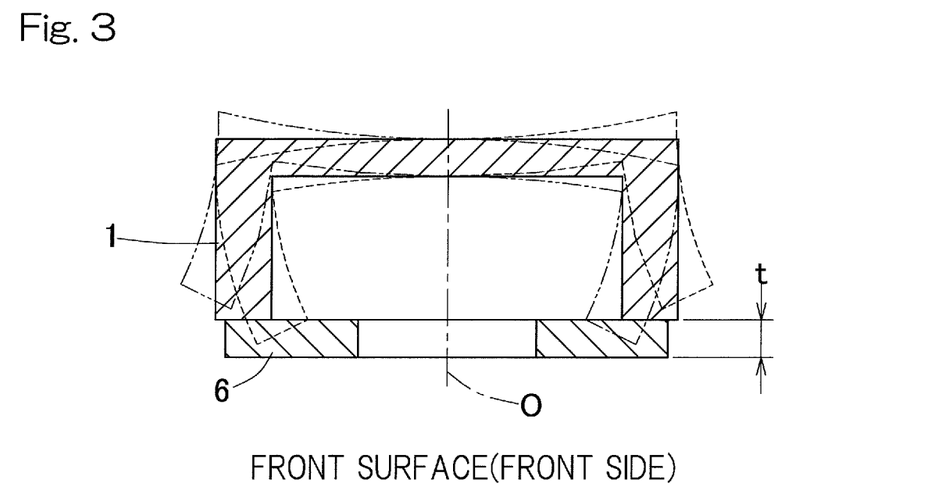
FIG. 3 is a schematic sectional view showing a tool support body and an attenuation inducing member for the machine tool.

The reason that the rigidity of the turret type tool post in the radial direction tends to become controversial will now be discussed. As shown in FIG. 3, the tool support body 1 represents a generally U-sectioned shape open at the front surface side thereof. For this reason, the tool support body 1 has a characteristic so as to be easily deformable to a shape, in which a front surface portion thereof where the contact surface with the attenuation inducing member 6 lie opens with respect to the center axis O (as shown by the double dotted line) and a shape in which that front surface portion thereof is closed as shown by the broken line. Accordingly, in order to prevent the vibration accompanying this deformation, the rigidity of the attenuation inducing member 6 in the radial direction preferably is to be higher than that of the tool support body 1.

Since the attenuation inducing member 6 is in the form of a flat plate shape, such deformation as discussed above, which is induced in the tool support body 1, occurs seldom.

In other words, the attenuation inducing member 6 has the rigidity in the radial direction is higher than that of the tool support body 1 in terms of shape or structure. In order to obtain the rigidity higher than that of the tool support body 1, the thickness t of the attenuation inducing member 6 preferably is designed by, for example, experiments and simulations.

The attenuation inducing member 6 is made of a metallic material such as, for example, a steel material. Where the tool support body 1 is made of the cast steel material, the rigidity of the attenuation inducing member 6, which is higher than that of the tool support body in terms of material, is obtained if the attenuation inducing member 6 is made of the steel material. If the rigidity of the attenuation inducing member 6 is higher than that of the tool support body 1 in terms of shape or structure, the tool support body 1 and the attenuation inducing member 6 may be made of the same material.

Referring to FIGS. 1 and 2, the pressing and fitting mechanism 7 includes pressing and fitting units 7A provided at a plurality of circumferential sites. In the case of the present preferred embodiment, the position of each of the pressing and fitting units 7A is rendered to be the same in circumferential phase as each of angles of the polygonal shape that is assumed by the front surface shape of the tool support body 1.

Figure 4:
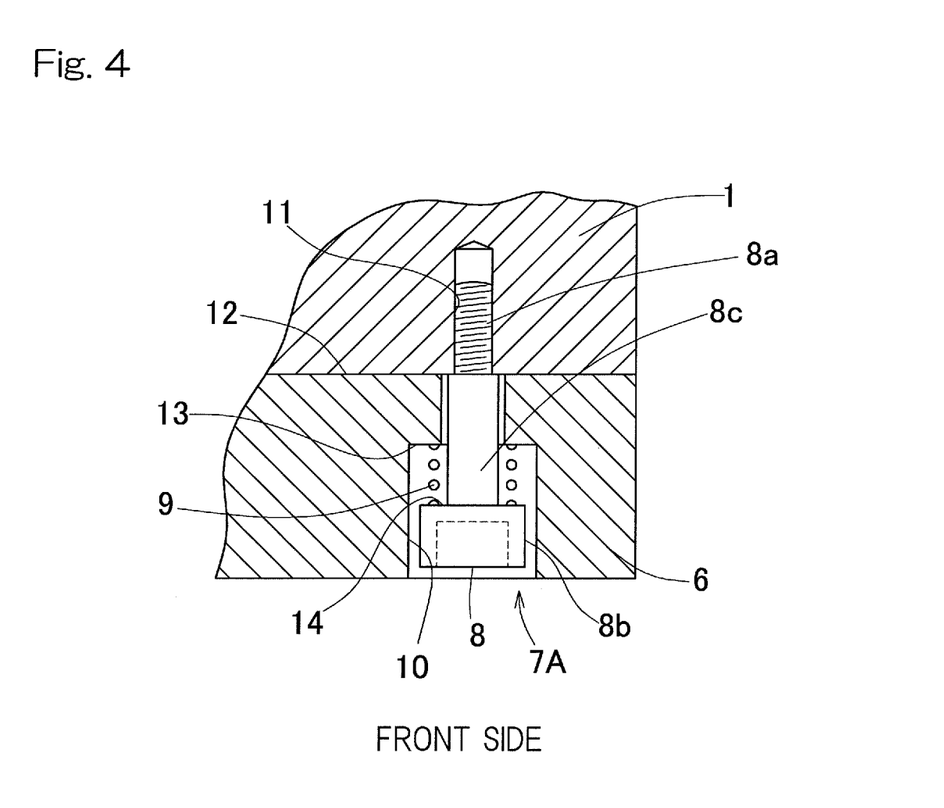
FIG. 4 is a schematic fragmentary sectional view showing a portion of a pressing and fitting mechanism included in the vibration reducing device.

As shown in FIG. 4, each of the pressing and fitting units 7A includes a fitting member 8 in the form of, for example, a hexagonally perforated bolt, and a spring member 9 in the form of, for example, a compression spring. The spring member 9 may be a disc spring. The attenuation inducing member 6 is provided with a counter-sunken bolt insertion hole 10 through which the fitting member 8 is inserted. Also, at a position corresponding to the bolt insertion hole 10 in the front surface of the tool support body 1, a threaded hole 11 is provided which is engageable with a male screw portion 8a of the fitting member 8.

The bolt insertion hole 10 includes a stepped surface which defines a first spring member seating surface 13 that is parallel or substantially parallel to the contact surface between the tool support body 1 and the attenuation inducing member 6. Also, the fitting member 8 includes a head portion 8b, the rear surface of which defines a second spring member seating surface 14. In a condition with the fitting member 8 having been inserted into the bolt insertion hole 10, the second spring member seating surface 14 faces the first spring member seating surface 13. The spring member 9 is mounted around an outer periphery of a shank portion 8c of the fitting member 8 and is interposed between the first spring member seating surface 13 and the second spring member seating surface 14. The shank portion 8c is which lies between the male screw portion 8a and the head portion 8b and preferably has a diameter greater than that of the male screw portion 8a. The fitting member 8 is fixed to the tool support body 1 with a stepped surface between the male screw portion 8a and the shank portion 8c brought into contact with the front surface of the tool support body 1. It is to be noted that FIG. 2 illustrates only one set of the fitting member 8 and the spring member 9, which is provided in one of the pressing and fitting units 7A.

According to the vibration reducing device 5 of the structure hereinabove described, by the pressing and fitting mechanism 7, the attenuation inducing member 6 is fitted to the front surface of the tool support body 1 in a pressed condition. When a vibration accompanying such a deformation as shown by the double dotted line and the broken line in FIG. 3 occurs in the tool support body 1, the front surface portion of the tool support body 1 undergoes deformation in a radial direction. The vibration of the tool support body 1 is also transmitted to the attenuation inducing member 6 that is in contact with the tool support body 1.

However, since the attenuation inducing member 6 has a higher rigidity in the stretching direction, that is, the radial direction along the contact surface between the attenuation inducing member 6 and the tool support body 1 than that of the tool support body 1, the vibration is small as compared with that in the tool support body 1, and therefore, the relative slip in the radial direction may occur between the attenuation inducing member 6 and the tool support body 1. Due to this slip, a frictional force is generated in a direction in which it acts as a resistance to the vibration generated in the tool support body 1. Accordingly, vibratory energies, which are a contributing factor of the vibration in the tool support body 1, are absorbed by frictional attenuation caused by the frictional force so generated. By controlling the pressing force with which the attenuation inducing member 6 is pressed against the tool support body 1 so that a proper frictional attenuation is obtained, the vibration of the tool support body 1 is suppressed with the vibratory energies having been diminished.

The magnitude of the pressing force referred to above may be determined depending on the magnitude of the vibration desired to be suppressed. Where the vibration of a low amplitude is desired to be suppressed, the pressing force is weakened. However, in this case, the attenuation effect brought about is low. Conversely, where the vibration of a high amplitude is not permitted, the pressing force has to be high. In this case, the attenuating effect is high, but the effect is little on the vibration of a low amplitude.

In the preferred embodiment discussed above, the attenuation inducing member 6 preferably is pressed against the tool support body 1 by means of the pressing force brought about by an elastic restoring force of the spring member 9 interposed between the first spring member seating surface 13 of the attenuation inducing member 6 and the second spring member seating surface 14 of the fitting member 8. If the attenuation inducting member 6 is pressed against the tool support body 1 via the spring member 9 in the manner described above, deviation of the pressing force caused by, for example, processing errors and fitting errors of various members forming respective portions of the pressing and fitting mechanism 7 is small, and therefore, the pressing force is easily controlled. Also, by exchanging the spring member 9 with another spring member having a spring constant different from that of the spring member 9, or by inserting a shim (not shown) between the first spring member seating surface 13 and the spring member 9 or between the second spring member seating surface 14 and the spring member 9, the pressing force is easily changed.

The pressing and fitting mechanism 7 in this preferred embodiment preferably makes use of a compression coil spring for the spring member 9, but a tension spring may be used for the spring member 9. Also, instead of the elastic restoring force of the spring member 9, a magnetic force of attraction produced by a magnet, or a pressing force produced by a piezoelectric element or the like may be used for the pressing force with which the attenuation inducing member 6 is pressed against the tool support body 1.

Since in the present preferred embodiment, the pressing and fitting mechanism 7 includes the pressing and fitting units 7A at the plurality of circumferential sites and the pressing force exerted by each of the pressing and fitting units 7A is adjustable, the attenuation inducing member 6 contacts the front surface of the tool support body 1 under uniform or substantially uniform pressing forces acting on various circumferential portions of the attenuation inducing member 6. For this reason, with the vibratory energies diminished effectively, the vibration of the tool support body 1 is significantly reduced or prevented.

Figure 5:
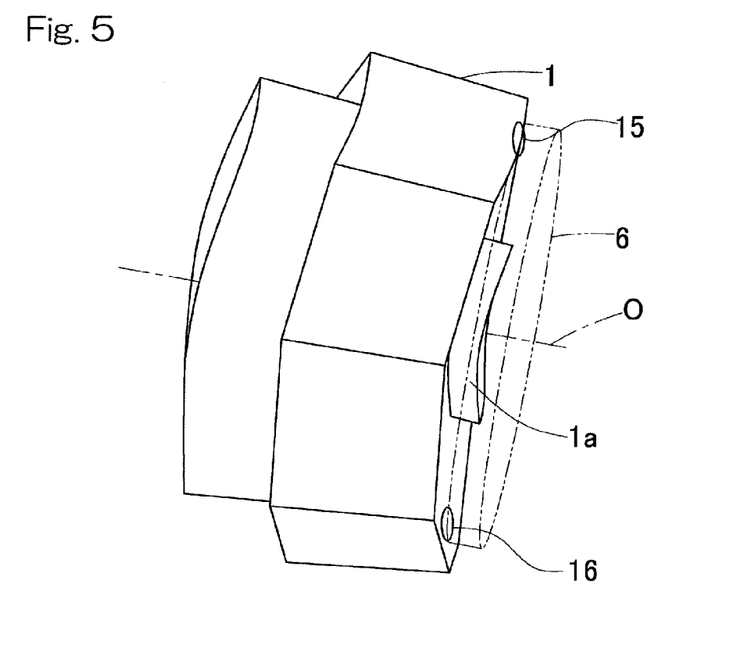
FIG. 5 is a perspective view showing the relationship between the tool support body and the attenuation inducing member when the tool support body is deformed.
Figure 6:
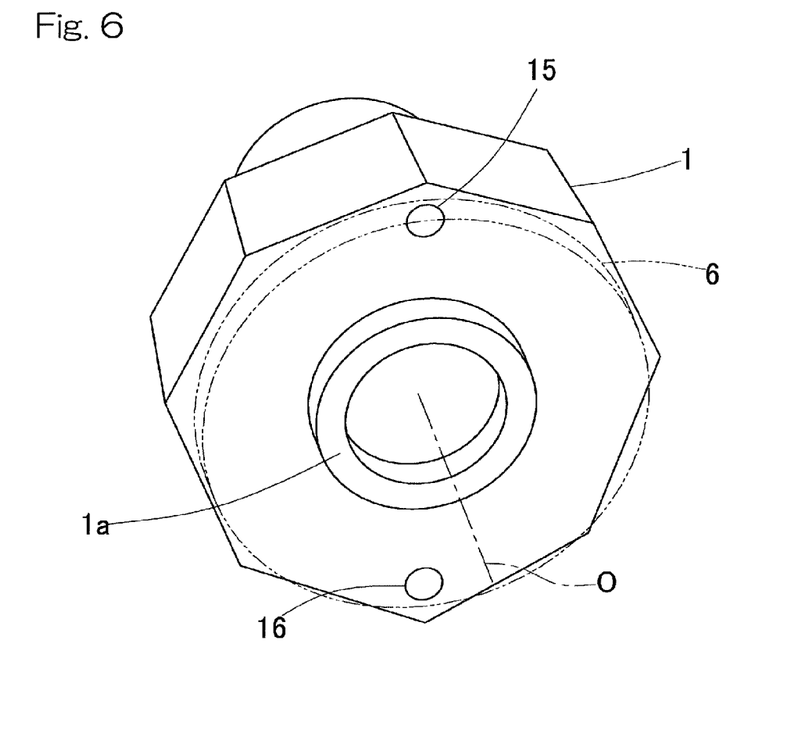
FIG. 6 is a perspective view showing a condition as viewed in an angle different from that shown in FIG. 5.

In the foregoing description of the principle of frictional attenuation, the deformation of the tool support body 1 has been simplified as represented by the deformation shown in FIG. 3, but, in practice, three-axis directional forces from the tool 2 act on the tool support body 1, and therefore, as shown in FIGS. 5 and 6, a complicated deformation occurs accompanied by twist about the center axis O and undulation in the circumferential direction. For this reason, at the time of deformation of the tool support body 1, the contact between the tool support body 1 and the attenuation inducing member 6 is not necessarily accomplished over the entire periphery.

However, if as is the case with this preferred embodiment, in the front surface of the tool support body 1, the attenuation inducing member 6 is of such a shape as to result in the contact over the entire periphery about the center axis O of the tool support body 1, the tool support body 1 and the attenuation inducing member 6 contact each other at the plurality of contact sites, for example, at two contact sites 15 and 16, during the deformation of the tool support body 1. For this reason, as compared with the contact between the tool support body 1 and the attenuation inducing member 6 at one contact site, a marked effect of frictional attenuation is obtained.

Figure 7:
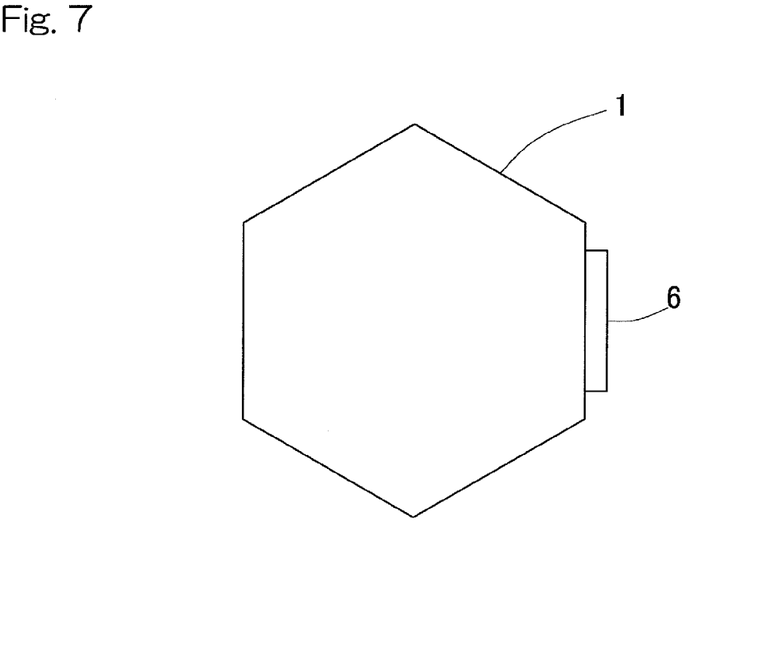
FIG. 7 is a schematic front elevational view of the tool support body and the attenuation inducing member, showing a different example of arrangement of the attenuation inducing member.

During the deformation of the tool support body 1, the contact between the tool support body 1 and the attenuation inducing member 6 may not occur at the plurality of contact sites. By way of example, as shown in FIG. 7, even though arrangement is made that the attenuation inducing member 6 is fitted to one site of the outer peripheral surface portion of the tool support body 1 which has a front shape representing a polygonal shape, the effect to frictionally attenuate the vibration of the tool support body 1 is obtained.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, although in describing the foregoing preferred embodiments of the present invention, the tool support body 1 has been shown and described as the turret type tool post, the tool support body 1 may be a fixed type tool post such as, for example, a serrated type.

Accordingly, such changes and modifications are, unless they depart from the scope of the present invention as delivered from the claims annexed hereto, to be construed as included therein.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vibration reducing device for a machine tool to reduce vibration generated in a tool support body to support a tool, the vibration reducing device comprising:
    an attenuation inducing member that is configured to be brought into contact with the tool support body so as to generate a frictional force in a direction in which the frictional force acts as a resistance to the vibration generated in the tool support body, the attenuation inducing member having a rigidity in a direction of a contact surface between the attenuation inducing member and the tool support body, and the rigidity of the attenuation inducing member is higher than a rigidity of the tool support body; and
    a pressing and fitting mechanism configured to fit the attenuation inducing member to the tool support body in a pressed condition; wherein
    the tool support body includes a turret-shaped tool post of a round or polygonal shape having a peripheral surface to which the tool is fitted;
    the attenuation inducing member contacts a front surface of the tool support body about a center axis of the tool support body; and
    the rigidity of the attenuation inducing member in the direction of the contact surface is in a radial direction of the turret-shaped tool post.

2. The vibration reducing device for the machine tool as claimed in claim 1, wherein the attenuation inducing member contacts the tool support body at a plurality of contact sites thereof during deformation of the tool support body.

3. A vibration reducing device for a machine tool to reduce vibration generated in a tool support body to support a tool, the vibration reducing device comprising:
    an attenuation inducing member that is brought into contact with the tool support body so as to generate a frictional force in a direction in which the frictional forces acts as a resistance to the vibration generated in the tool support body, the attenuation inducing member having a rigidity in a direction of a contact surface between the attenuation inducing member and the tool support body, and the rigidity of the attenuation inducing member is higher than a rigidity of the tool support body; and
    a pressing and fitting mechanism configured to fit the attenuation inducing member to the tool support body in a pressed condition; wherein
    the attenuation inducing member includes a first spring member seating surface that is parallel or substantially parallel to a contact surface between the tool support body and the attenuation inducing member, and the pressing and fitting mechanism includes a second spring member seating surface that faces the first spring member seating surface;
    the vibration reducing device further comprising:
    a fitting member fitted to the tool support body; and
    a spring member interposed between the first spring member seating surface and the second spring member seating surface and configured to press the attenuation inducing member against the tool support body.

\* \* \* \* \*